Sept. 25, 1923.
C. K. BIRD ET AL
1,468,731
APPARATUS FOR CORRECTING MALOCCLUSION.
Filed Aug. 28, 1922   2 Sheets-Sheet 1
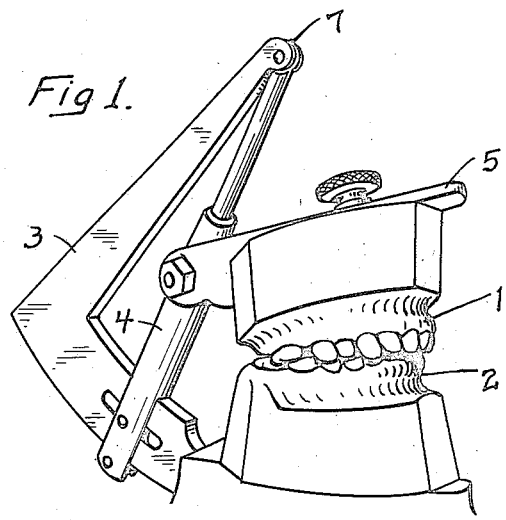
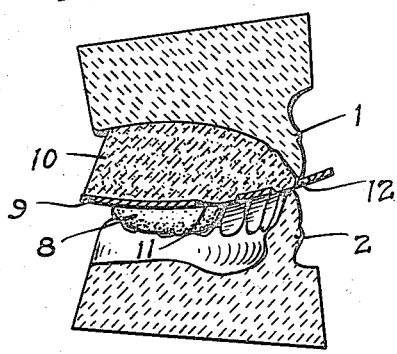
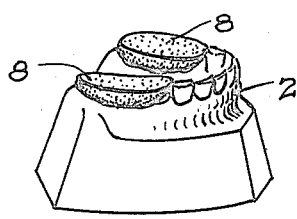
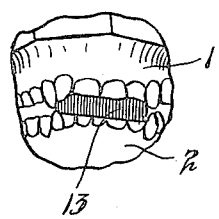
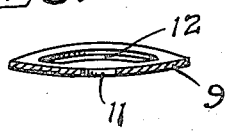
INVENTORS
CLEMENT K. BIRD
HARVEY B. WASHBURN
BY James F. Williamson
THEIR ATTORNEY Sept. 25, 1923. 1,468,731
C. K. BIRD ET AL
APPARATUS FOR CORRECTING MALOCCLUSION
Filed Aug. 28, 1922 2 Sheets-Sheet 2

INVENTORS
CLEMENT K. BIRD
HARVEY B. WASHBURN
BY James T. Williamson
THEIR ATTORNEY Patented Sept. 25, 1923.

1,468,731

UNITED STATES PATENT OFFICE.

CLEMENT K. BIRD AND HARVEY B. WASHBURN, OF ST. PAUL, MINNESOTA.

APPARATUS FOR CORRECTING MALOCCLUSION.

Application filed August 28, 1922. Serial No. 584,904.

*To all whom it may concern:*

Be it known that we, CLEMENT K. BIRD and HARVEY B. WASHBURN, citizens of the United States, residing at St. Paul, in the county of Ramsey and State of Minnesota, have invented certain new and useful Improvements in Apparatus for Correcting Malocclusion; and we do hereby declare the following to be a full, clear, and exact description of the invention, such as will enable others skilled in the art to which it appertains to make and use the same.

This invention relates to a method and means for restoring correct anatomical relationship of certain parts of the head, and particularly to a method and apparatus for correcting mal-occlusion and restoring correct facial dimension.

When the teeth are lost or removed or become worn, the teeth on either jaw tend to extend into the spaces below or above them, the surfaces of the teeth attempting to make contact. This results in a movement of the jaws toward each other and in an incorrect positioning of the same causing an unbalanced occlusion and a distorted facial condition.

When the jaws move together and an unbalanced occlusion results, the set of muscles, whose function it is to move the lower jaw toward the upper jaw, become relaxed and lose muscular tone. These muscles thus atrophy more or less reducing proper tension on the salivary and other glands and impairing the action and function thereof. The sagging of the said muscles creates what is familiarly known as "chops" in the features and often produce lines running from the base of the nose to the corners of the mouth. The act of swallowing is more or less interfered with and the saliva is improperly drained from the mouth. The act of swallowing assists in keeping the Eustachian tubes open and the closing of the jaws and the relaxing of said muscles seriously impair this function. Such closing of the jaws also results in a rearward movement or encroachment of the condyle which in many cases results in partial or total impairment of the hearing. The unbalanced occlusion also results in dental trouble often diagnosed as pyorrhea. About ninety or ninety-five per cent of the so-called pyorrhea is really traumatic injury caused by mal-occlusion.

The correct movement of the lower jaw should take place upon the arc of a circle whose radius averages approximately four inches, so that the surface of the teeth move on substantially the surface of a sphere. This surface, on which the operative surfaces of the teeth move in balanced occlusion, will be referred to as the occlusal surface.

It is an object of this invention to correct mal-occlusion by determining a correct occlusal surface and properly positioning the same in the mouth.

It is a further object of the invention to restore correct facial dimension by providing a device embodying a correct occlusal plane or surface and reconstructing the teeth in accordance with such surface.

It is more specifically an object of the invention to provide a means for correcting mal-occlusion and restoring correct facial dimension by using reproductions of the jaws to determine the correct relative positions thereof and a correct occlusal surface, and then forming means having said surface thereon for correctly positioning said surface in the mouth to form a guide for the dental reconstruction.

These and other objects and advantages of the invention will be fully set forth in the following description made in connection with the accompanying drawings in which like reference characters refer to the same parts throughout the different views, and in which, Fig. 1 is a perspective view showing reproductions of incorrectly located or broken down jaws;

Fig. 4 is a perspective view of the cast of the lower jaw illustrating a step in the process;

Fig. 5 is a vertical section taken centrally through the reproduced jaws shown in Fig. 3;

Fig. 8 is a transverse section of the plate shown in Fig. 7 taken substantially on line 8—8 of said figure;

Fig. 9 is a partial front view of the jaw reproductions illustrating a step in the process;

Fig. 10 is a perspective view of a device used in the process; and

Figure 2:
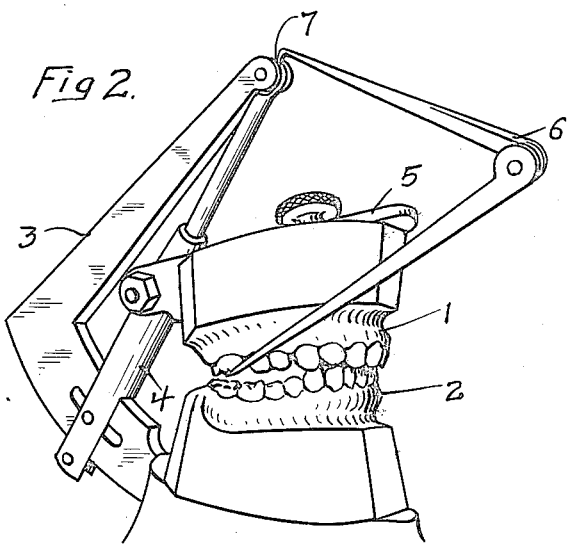
Fig. 2 is a perspective view showing the reproductions of the jaws adjusted to a corrected position.
Figure 3:
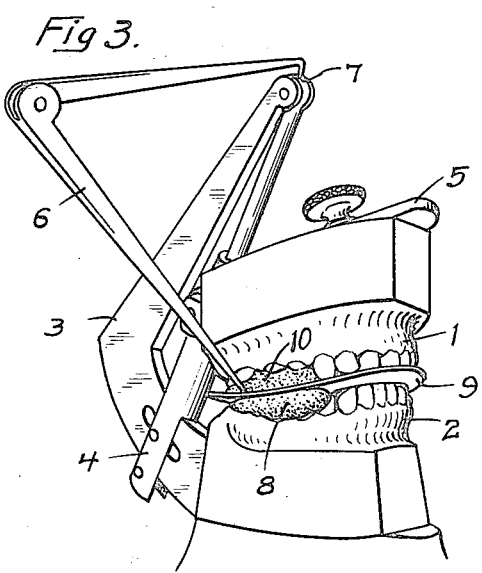
Fig. 3 is a perspective view showing a further step in the process.
Figure 6:
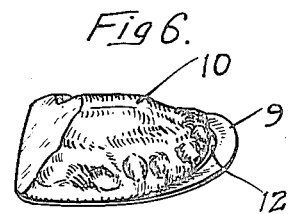
Fig. 6 is a perspective view of the means for positioning the determined occlusal surface.

In carrying out the process, casts or reproductions of the upper and lower jaws are made and by the aid of a transfer bow, these reproductions are mounted upon an adjustable instrument in the same relation as the actual jaws. The bite of the jaws is now opened and the same adjusted longitudinally into substantially correct relationship. This step is illustrated in Fig. 2. The reproduction of the upper jaw is designated as 1 and that of the lower jaw as 2, the instrument, in which the same are mounted and adjusted comprising a main portion 3 and adjustable arms 4 and 5.

The next step in the process is the determination of a correct occlusal surface. By means of a pair of dividers, illustrated as 6, this surface can be determined at various points about the mandible. The distance between the ends of the dividers will be approximately four inches and one end of the dividers will be positioned at the top point 7 of the arm 3, and the other end can then be swung to various positions around the cast to determine just where the occlusal surface will pass in relation to the teeth. After the surface has been determined and properly located, the reproductions of the jaws are firmly clamped in correct position to the instrument.

Figure 7:
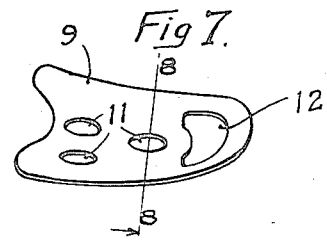
Fig. 7 is a perspective view of the plate used in the process.

The next step in the process consists in building up with soft modeling compound on the mandible substantially to the determined surface. This material 8 is placed on the posterior teeth, as shown in Fig. 4. The surface of the compound 8 will be substantially a spherical surface and will coincide with the occlusal surface determined upon. The compound, after being thus placed in position, will be chilled or hardened and a plate 9, shown in Figs. 7 and 8, is formed, the under surface of which is substantially the segment of a sphere and this plate is laid upon the mandible on top of the material 8. The plate 9 being thus properly positioned, soft wax or modeling compound 10 is placed upon the same and the upper jaw or cast 1 is pressed down upon the material 10, until said upper cast comes into its correct adjusted position. The material 10 will receive the impression of the upper teeth and will also be molded to the exact shape of the arch or upper portion of the mouth. The material will also project and protrude through the openings 11 formed in the plate 9, and thus become attached thereto. This material 10 is now chilled or hardened and the same, together with the plate 9, can be removed. Material 10 and plate 9 thus form a gauging or positioning means for the occlusal surface, which surface is comprised or carried on said means.

The positioning means, comprising members 9 and 10, is now transferred to the patient's mouth and will, of course, exactly fit therein. The occlusal surface determined is thus accurately positioned in the mouth. The gauging means can be disposed in the mouth without any discomfort to the patient and can be held therein in any suitable manner. The plate 9 is provided with a slot 12 extending through the same adjacent to its front edge. In some cases, some of the compound 10 will project over or through the slot 12 and will receive the impression of the front teeth on the lower jaw. These impressions will further assist in correctly positioning said material and the plate 9 in the mouth.

With the occlusal surface thus determined and positioned, the teeth of the lower jaw are reconstructed in accordance with this surface by either partial or full denture work. The reconstruction may be done by any type of dental work, such as bridge work, crown work, plate work, etc., and such reconstruction can be performed, one tooth at a time, or by replacing of the whole lower dentition.

The reconstruction of the teeth being completed on the lower jaw, the occlusal surface is thus clearly determined and the same can be used as a guide for the reconstruction of the teeth on the upper jaw.

As the bite closes or the jaws approach due to worn or lost teeth, the set of muscles acting to move the lower jaw upward and forward become relaxed and the set of muscles acting to move said jaw upward and backward preponderate and the jaw is moved up and back into incorrect position. As said jaw tends to take this position, it is necessary to hold the patient's jaws in correct longitudinal position while the upper teeth are being reconstructed. To so hold the jaws in their correct position, use is made of a small "tie-in" device. This consists of a small portion of wax or compound which is placed between the reproductions of the jaws, between the anterior teeth, as shown in Fig. 9 and the teeth then brought to their correct position for central occlusion. This device, designated as 13, thus receives the impression of the teeth and becomes hard and acts as a locating gauge. This gauge may be placed between the teeth of the patient and the jaws will thus be brought to correct position. Cavities are now prepared and filled with an excess of inlay wax. The gauge or "tie-in" device 13 is now put in place and the patient closes his jaws to new and correct position against said wax, thus giving the proper impression of reconstructed lower teeth in the wax which can then be carved to proper contour.

It may be desired by some dentists to build up the teeth in accordance with the determined occusal surface directly on the reproductions or casts and then transfer the inlays or other work to the patient's mouth.

The plate 9 is usually referred to as an occlusion former and will preferably be made of comparaively thin non-corrosive material or plated steel. The same is substantially heel-shaped in plan, and, as stated, is formed substantially as a segment or portion of a sphere. In some cases, the slot 12 in the plate as well as the other apertures therein may be omitted. The plate is formed with a curved cut-out portion at its rear and rearwardly projecting side portions to accommodate the tongue.

If the occlusion is substantially correct and perfect, there is a definite dimension from the upper portion of the skull to the point of the chin. When the jaws become incorrectly located, due to imperfection in the teeth, this dimension is altered and the features thus more or less distorted. With the described process, after the teeth have been reconstructed, in accordance with the determined and correct occlusal surface and a balanced occlusion thus produced, the original dimension from the upper portion of the skull to the chin is restored and the features thus brought to a normal condition.

By restoring the jaws to correct position both by opening the bite and by moving the jaws longitudinally, thus producing a balanced occlusion, the anatomical parts are brought into the original and correct relationship and the functions thereof are fully restored. The clinical history of some of the cases in which the herein described process has been performed is really wonderful. Various ailments resulting from the abnormal condition have been eliminated and the patients restored to health and vigor.

It will, of course, be understood that various changes may be made in the apparatus used, without departing from the scope of applicants' invention, which generally stated, consists in a device capable of carrying out the objects above enumerated and in the apparatus shown and described and set forth in the appended claims.

Figure 11:
Fig. 11 is a perspective view of a modified form of plate used.

In Fig. 11 is shown a plate or occlusal former $9^a$ similar in all respects to the plate 9 except the same is provided with a handle 14 for convenience of manipulation.

What is claimed is:—

1. A member for determining an occlusal surface comprising a plate substantially heel-shaped in plan and curved substantially in the surface of the sphere, said plate having a plurality of openings therethrough.

2. The structure set forth in claim 1, said plate also having a transverse opening therethrough adjacent its front edge.

3. An occlusal former comprising a plate formed as a portion of a spherical surface and adapted to be located between and supported from one of a person's jaws or reproductions thereof.

4. The structure set forth in claim 3, said plate having a central entrant curve at its rear edge and rearwardly projecting portions at each side thereof.

In testimony whereof we affix our signatures.

CLEMENT K. BIRD.
HARVEY B. WASHBURN.